United States Patent [19]

Dufresne

[11] Patent Number: 5,485,339
[45] Date of Patent: Jan. 16, 1996

[54] SAFETY ELECTRICAL ASSEMBLY FOR ELECTRIC POWER EQUIPMENT

[76] Inventor: Jacques Dufresne, 6889, avenue Lamont, Montréal, Québec, Canada, H4E 2T8

[21] Appl. No.: 443,390

[22] Filed: May 17, 1995

Related U.S. Application Data

[63] Continuation of Ser. No. 171,684, Dec. 22, 1993, abandoned.

[51] Int. Cl.$^6$ ........................................................ H02H 3/14
[52] U.S. Cl. .................................... 361/42; 361/49
[58] Field of Search .................................... 361/42, 47, 49, 361/50; 340/650, 651; 307/362

[56] References Cited

U.S. PATENT DOCUMENTS

| | | | |
|---|---|---|---|
| 3,426,342 | 2/1969 | De Langis | 340/649 |
| 3,602,772 | 8/1971 | Hundhausen | 361/45 |
| 3,659,152 | 4/1972 | De Langis | 317/18 B |
| 3,846,777 | 11/1974 | Brown | 340/252 R |
| 3,942,604 | 3/1976 | Black, III | 180/103 R |
| 4,687,906 | 8/1987 | Fujishima et al. | 361/42 |
| 5,105,325 | 4/1992 | Lawrence | 361/42 |

FOREIGN PATENT DOCUMENTS 902232  6/1972  Canada.

Primary Examiner—A. D. Pellinen
Assistant Examiner—Sally C. Medley
Attorney, Agent, or Firm—Robic

[57] ABSTRACT

In an electric power equipment connected to an electrical power source, a defective ground conductor may result in a dangerous situation for a user. To prevent such a situation, the electric power equipment is provided with a safety electrical assembly having a safety switch mounted between the neutral conductor and the ground conductor on the electric power equipment. The safety electrical assembly also has a female plug provided with a ground socket connected to the ground wire of the power source, a neutral socket not connected to the neutral were of the power source, and one or two power sockets connected to one or two corresponding power wires of the power source. The female plug also has a relay having a normally open switch mounted in series with one of the power wires and a control coil mounted between the one power wire and the neutral socket, and a first light indicator mounted between a stationary contact of the relay and the ground wire in such a manner so as to be visible to the user.

5 Claims, 3 Drawing Sheets

FIG. 3
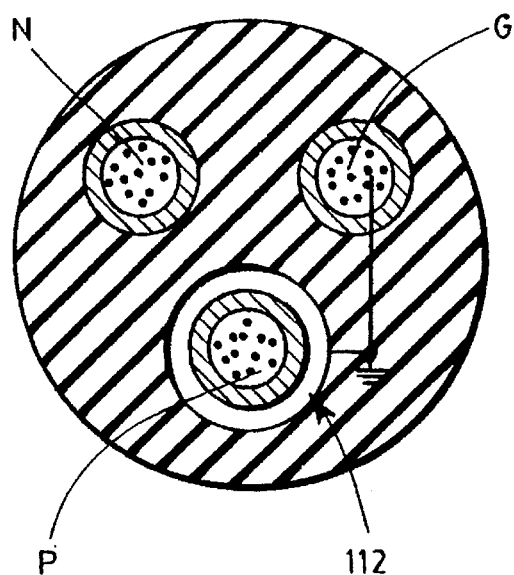
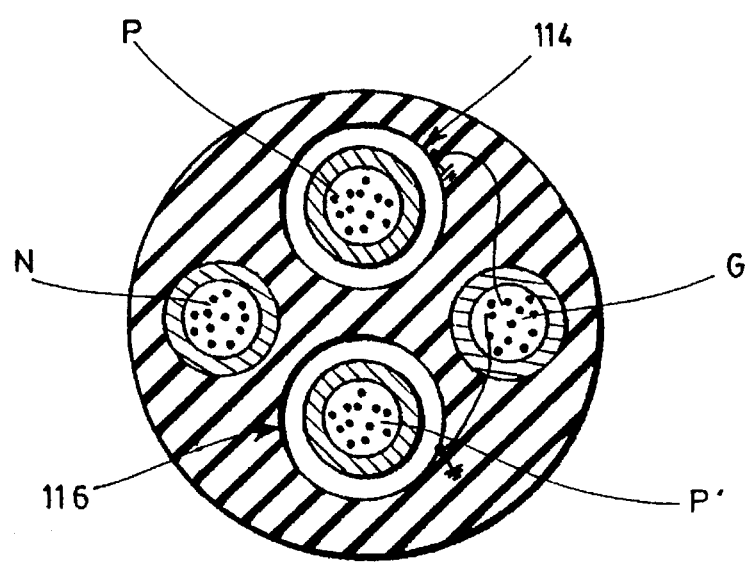
FIG. 4

5,485,339

SAFETY ELECTRICAL ASSEMBLY FOR ELECTRIC POWER EQUIPMENT

This application is a continuation of application Ser. No. 08/171,684, filed Dec. 22, 1993 is claimed under 37 CFR 1.28(a).

BACKGROUND OF THE INVENTION

1. Field of the Invention

The present invention relates to a safety electrical assembly for electric power equipment, more particularly for electric motor-driven lawn-mowers, hedge trimmers and other devices of the type supplied with at least three-wire power source.

2. Brief Description of the Prior Art

Known in the art, there is a Canadian patent no. 902,232 of E. Hundhausen et al., granted on Jun. 6, 1972. This patent describes a protective circuit for electrically driven lawn-mowers and the like including an auxiliary conductor so arranged in cross section of a cable, that before the main conductor insulation is cut the auxiliary conductor is severed and the current flowing through the auxiliary conductor is interrupted. Consequently, a relay, mounted in series with the auxiliary conductor, is deprived of current and its switches opened so that the whole cable connecting the equipment to an electrical power source is deprived of current.

Also known in the art, there is U.S. Pat. No. 3,659,152 of P. A. De Langis, granted on Apr. 25, 1972. This patent describes a ground detector and guard circuit which prevents operation of an appliance or instrument unless the associated source has a grounded conductor. This guard circuit includes a ground wire, a pair of line conductors, and a control relay having one terminal connected to the ground wire and respective neon lamps connected between the line conductors and another terminal of the control relay. If one of the line conductors is damaged or cut, the control relay is deprived of current and its switch opened, thereby preventing energization of an associated appliance or instrument. The absence of proper ground is signalled by the neon lamps.

Also known in the art, there is U.S. Pat. No. 3,426,342 of P. A. De Langis granted on Feb. 23, 1969. This patent describes another protective and guard circuit.

One drawback with the protective or safety circuits shown in the above patents is that they do not prevent operation of the electric equipment when the ground conductor of the cable connected between a housing of the equipment and the corresponding male plug is not operative.

OBJECTS AND SUMMARY OF THE INVENTION

It is therefore an object of the present invention to provide a safety electrical assembly for electric power equipment with a circuit arrangement that prevents operation of the electric power equipment unless the cable connecting the electric power equipment to the electrical power source has a well grounded conductor, and that including the ground conductor of the cable connected between a housing of the equipment and the corresponding male plug.

In accordance with the present invention, the above object is achieved with a safety electrical assembly for connecting an electric power equipment, having a housing, a main switch and; a male plug having a ground prong, a neutral prong and at least one power prong, that are respectively connected to a ground conductor, a neutral conductor and at least one power conductor, to an electrical power source including a ground wire, a neutral wire and at least one power wire said safety electrical assembly comprising: a safety switch mounted onto said housing; between said neutral conductor and said ground conductor and a female plug comprising a ground socket engageable with the ground prong for connection to the ground wire, a neutral socket engageable with the neutral prong, and not connected and at least one power socket engageable with the at least one power prong for connection to the at least one power wire.

The female plug comprises a relay having a normally open switch mounted in series with the at least one power wire and being activated by electricity passing from said at least one power wire to said neutral socket through a control coil mounted between the at least one power wire and the neutral socket. The female plug also comprises first light means mounted between the normally open switch and the ground wire in such a manner so as to be visible to a user, for indicating that the relay is operative.

Preferably, the combination also includes various light means for indicating that the ground is operative, when the auxiliary switch is on.

BRIEF DESCRIPTION OF THE DRAWINGS

In order to impart full understanding of the manner in which this and other objectives are attained in accordance with the present invention, the preferred embodiments thereof will be described hereinafter with reference to the accompanying drawings, wherein:

FIG. 3 is a cross section view of a cable of FIG.1 connected between a housing of an electric power equipment and a male plug.

FIG. 4 is a cross section view of a cable of FIG.2 connected between a housing of an electric power equipment and a male plug.

DESCRIPTION OF THE PREFERRED EMBODIMENTS

Figure 1:
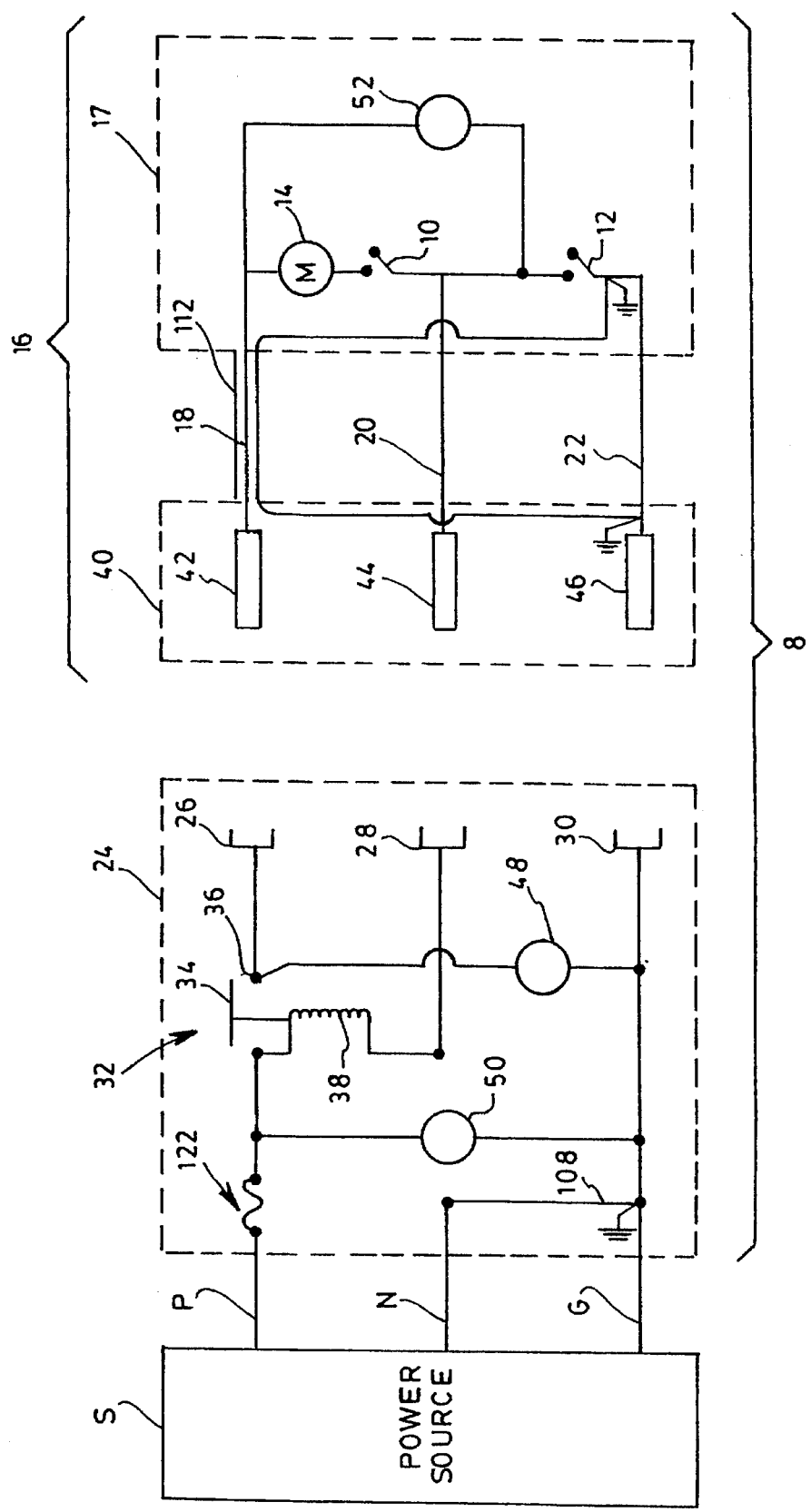
FIG. 1 is a schematic exploded view of an electrical safety assembly according to the present invention for a three-wire electrical power source.

FIG. 1 is a schematic exploded view of the safety electrical assembly connected to an electrical power source S (such as 110V source) including a power wire P, a neutral wire N and a ground wire G.

As shown, the electric power equipment 16 includes a motor 14 and a main switch 10. The equipment is also provided with a male plug 40 which has a ground prong 46, a neutral prong 44, and a power prong 42. These prongs are respectively connected to a ground conductor 22, a neutral conductor 20 and a power conductor 18, and respectively for engaging with a ground socket 30, a neutral socket 28, and a power socket 26 of the corresponding female plug 24. The ground socket 30 and the power socket 26 are respectively connected to the wires G and P of the electrical power source S. As shown, the neutral socket 28 is not connected to the neutral wire N. Preferably, the female plug 24 is provided with an auxiliary conductor 108 connected between the neutral wire N and the ground wire G, for grounding the neutral wire N of the electrical source S.

The female plug 24 is also provided with a relay 32 which has a normally open switch 34 mounted in series a the power wire P and a control coil 38 mounted between the power wire P and a neutral socket 28. The female plug 24 is also provided with a first light indicator 48 mounted between the stationary contact 36 of the relay 32 and the ground wire G in such a manner so as to be visible to the user. This light indicator 48 is for indicating that the relay 32 is operative. As is known, the normally open switch of the relay, after it has been closed, could be stuck and not open even if the control coil has been deprived of current. The first light indicator 48 can be a LED. However, as can be apparent to those skilled in the art, any other suitable indicator such as a neon lamp could be used for indicating that the relay 32 is operative.

The safety electrical assembly also comprises a safety switch 12 mounted between the neutral conductor 20 and the ground conductor 22 and onto a housing 17 of the electric power equipment 16.

In operation, when the power socket 26, the neutral socket 28 and the ground socket 30 are energized and respectively, the power prong 42, the neutral prong 44 and the ground prong 46 engaged therewith, after a user has closed the main switch 10, she or he must close the safety switch 12 in order to operate the electric power equipment 16. Of course, because of the arrangement of the circuitry, if the user has closed the safety switch 12 and the equipment 16 has not been energized, this would indicate that the ground conductor 22 or the ground wire G, or both, is or are not operative.

Preferably, the safety electrical assembly further comprises a second light indicator 52 mounted between the power conductor 18 and the ground conductor 22 via the safety switch 12 and in such a manner so as to be visible to the user, in order to provide a permanent and visual indication that the ground conductor 22 is operative when the safety switch 12 has been closed.

Also, the safety electrical assembly 8 further comprises a third light indicator 50 mounted to be visible between the power wire P and the ground wire G, before the normally open switch 34, in order to provide a permanent and visual indication that the ground wire G of the electrical power source S is operative.

Preferably, when the electric power equipment 16 is used in watery conditions, the power conductor 18 is provided with a protective shield 112, as shown in FIG. 3, which is made of filament of metallic conductors (not shown). This protective shield 112 is connected to the ground. In operation, when the power conductor 18 is cut or damaged, this shield 112 causes a short circuit activating a contact 122 of a single breaker cutting off the power supply of the electric power equipment 16.

As mentioned hereinbefore, if the user has closed the safety switch 12 and the electric equipment 16 has not been energized, he or she can determine if it is the ground conductor 22 or the ground wire G, or both, which is or are defective, by looking at the second and the third light indicators, 52 and 50.

The second and third light indicators can be LEDs. However, as can be apparent to those skilled in the art, any other suitable indicator such as the neon lamp could be used for indicating that the ground is operative.

Figure 2:
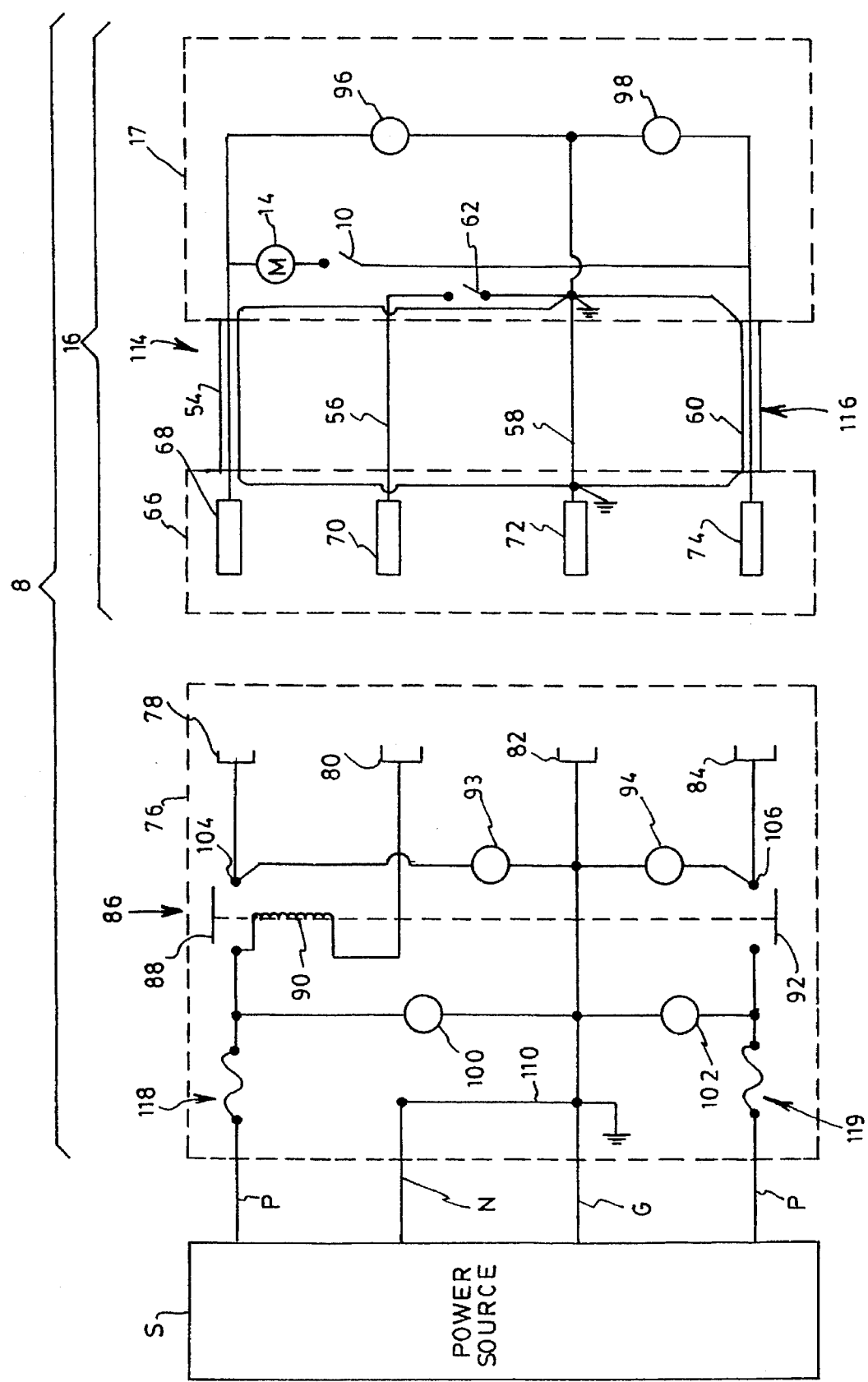
FIG. 2 is a schematic exploded view of an electrical safety assembly according to the present invention for a four-wire electrical power source.

In FIG. 2, there is shown the equivalent of the safety electrical assembly as described hereinbefore, for a four-wire electrical power source S' (such as a 110V–220V source) including a first power wire P, a second power wire P', a neutral wire N and a ground wire G Once again, the electric power equipment 16 is provided with a male plug 66 which has a ground prong 72, a neutral prong 70, and first and second power prongs, 68 and 74. These prongs are respectively connected to a ground conductor 58, a neutral conductor 56 a first power conductor 54, and a second power conductor 60, and respectively for engaging with a ground socket 82, a neutral socket 80, a first power socket 78, and a second power socket 84 of the corresponding female plug 76. The ground socket 82, the first power socket 78 and the second power socket 84 are respectively connected to the wires G, P and P' of the electrical power source S'.

Once again, the female plug 76 is also provided with a relay 86 which has two normally open switches 88 and 92 mounted respectively in series with the power wires P and P', and a control coil 90 mounted between the first power wire P and a neutral socket 80. The female plug 76 is also provided with two first light indicators, 92 and 93, mounted between the stationary contacts, 104 and 106, of the relay 86 and the ground wire G in such a manner so as to be visible to the user. These light indicators, 92 and 94, are for indicating that the relay 86 is operative.

The safety electrical assembly for the four-wire source also comprises a safety switch 62 mounted between the neutral conductor 56 and the ground conductor 58 and onto a housing of the electric power equipment 16.

Furthermore, for the four-wire electrical power source, the user can verify that the ground conductor 58 and the ground wire G are operative by closing the main switch 10 and the safety switch 62.

Once again, preferably, the safety electrical assembly further comprises two second light indicators, 96 and 98, mounted respectively between the first power conductor 54 and the ground conductor 58, and between the second power conductor 60 and the ground conductor 58, in such a manner so as to be visible to the user, for indicating that the ground is operative when the safety switch 62 has been closed.

Preferably, the safety electrical assembly further comprises two third light indicators, 100 and 102, respectively mounted to be visible between the power wire P and the ground wire G, before the normally open switches 88 and 92, in order to provide a permanent and visual indication that the ground wire G at the electrical power source S' is operative.

Once again, preferably, when the electric power equipment 16 is used in watery conditions, the power conductors, 54 and 60, are respectively provided with protective shields, 114 and 116, as shown in FIG. 4, each shield being made of filament of metallic conductors (not shown). These protective shields, 114 and 116, are connected to the ground. In operation, when the power conductors 54 or 60 are cut or damaged, these shields cause a short circuit activating the contacts, 118 and 119, of a double breaker cutting off the power supply of the electric power equipment 16.

As can be appreciated, the main advantage of the safety electrical assembly for electric power equipments for the three or four wire electrical sources, is that it prevents operation of the equipment unless the whole cable connecting the equipment to the source has a well grounded conductor. Therefore, the safety electrical assembly greatly reduces electrical hazards in using these electric equipments.

Although the present invention has been explained hereinabove by way of a preferred embodiment thereof, it should be pointed out that any modifications to this preferred embodiment within the scope of the appended claims is not deemed to alter or change the nature and scope of the present invention.

I claim:

1. A safety electrical assembly for connecting an electric power equipment to an electric power source, said electric power equipment including a housing, a main switch and a male plug having a ground prong, a neutral prong and at least one power prong respectively connected to a ground conductor, a neutral conductor, and at least one power conductor, and a safety switch;

said power source including a ground wire, a neutral wire and at least one power wire;

said safety switch connected between said neutral conductor and said ground conductor; and a female plug comprising;

a ground socket engageable with said ground prong for connection to said ground wire;

a neutral socket engageable with said neutral prong;

at least one power socket engageable with said at least one power prong for connection to said at least one power wire;

a relay comprising control coil mounted between said at least one power wire and said neutral socket and a normally open switch mounted in series with said at least one power wire, said relay also comprising a stationary contact adjacent said at least one power socket, said relay being activated by electricity passing from said at least one power wire to said neutral socket through said control coil; and first light means mounted between said stationary contact of said relay and said ground wire in such a manner so as to be visible to a user for indicating that said relay is operative, whereby, engagement of the safety switch provides indication that are the ground conductor and ground wired are operative, such that the relay will close and will allow the power equipment to be energized by actuation of the main switch.

2. The safety electrical assembly according to claim 1, further comprising second light means for mounting between said at least one power conductor and said ground conductor via said safety switch and in such a manner so as to be visible to the user, for indicating that the ground conductor is operative when said safety switch is on.

3. The safety electrical assembly according to claim 1, wherein said female plug further comprises third light means mounted to be visible between said at least one power wire and said ground wire, before said normally open switch, for indicating that the ground conductor is operative.

4. The safety electrical assembly according to claim 3, wherein said female plug further comprises an auxiliary conductor connected between said neutral wire and said ground wire, for grounding said neutral wire.

5. The safety electrical assembly according to claim 2, wherein said female plug further comprises an auxiliary conductor connected between said neutral wire and said ground wire, for grounding said neutral wire.

\* \* \* \* \*